United States Patent [19]

Kennedy

[11] Patent Number: 4,491,362
[45] Date of Patent: Jan. 1, 1985

[54] AUTOMOTIVE FIBERGLASS BODY

[76] Inventor: Thomas H. Kennedy, 33 Leighton Ave., Boardman, Ohio 44512

[21] Appl. No.: 304,655

[22] Filed: Sep. 23, 1981

[51] Int. Cl.³ .................. B62D 29/04; B62D 39/00
[52] U.S. Cl. ........................... 296/183; 296/31 P; 296/193
[58] Field of Search ............ 296/183, 181, 185, 188, 296/193, 194, 31 P, 29; 105/404, 409

[56] References Cited

U.S. PATENT DOCUMENTS

| | | | |
|---|---|---|---|
| 3,711,148 | 1/1973 | Hindin | 296/183 |
| 3,721,467 | 3/1973 | Kerr | 296/183 |
| 3,788,682 | 1/1974 | Ehrlich | 296/183 |
| 4,396,219 | 8/1983 | Cline | 105/423 |

Primary Examiner—Richard A. Bertsch
Attorney, Agent, or Firm—Oldham, Oldham & Weber Co.

[57] ABSTRACT

An automotive fiberglass body of unitary construction. Fundamentally, the invention includes a unitary outer shell having the top edge thereof being provided with an inverted U-shaped receptacle. The unitary inner shell has the upper edge thereof received by such receptacle and adhered thereto. The cavity between the inner and outer shells is filled with a close foam insulative material to add strength, rigidity, and insulation to the assembly. A support member connects to the bottom periphery of the outer shell and to the bottom surface of the inner shell in completing and supporting engagement.

1 Claim, 5 Drawing Figures

AUTOMOTIVE FIBERGLASS BODY

TECHNICAL FIELD

The invention herein resides in the art of fiberglass fabrications and, more particularly, to automotive bodies of fiberglass construction.

BACKGROUND ART

Heretofore, it has been known that fiberglass may be successfully used for automotive bodies. When properly constructed, utilizing state-of-the-art techniques for strengthening and reinforcing, fiberglass structures for automotive use have been well received, providing the desired strength and beauty for such applications while being virtually uneffected by rust, corrosion, or the elements. Indeed, replacement fiberglass bodies for various automotive vehicles have become known in the art. The invention herein particularly relates to such replacement fiberglass bodies for the American Motors models designated as Jeep CJ5 and CJ7. While fiberglass bodies have previously been manufactured and provided for these specific models, such structures have not incorporated an interlocking outer body shell with a finished interior shell. Additionally, the known replacement fiberglass bodies for these Jeep models have not incorporated a unitary interior shell, but have required seams which are given to breaking, leaking, lack of rigidity, and other undesired features. Further, no known replacement fiberglass bodies for these models have included means for encasing an insulative material between the inner and outer shells and to do so by the placement of a unitary interior shell.

DISCLOSURE OF INVENTION

In light of the foregoing, it is an object of a first aspect of the invention to provide an automotive fiberglass body which incorporates unitary mating inner and outer shells.

It is another object of an aspect of the invention to provide an automotive fiberglass body in which the inner shell is sealingly received by the outer shell.

A further object of an aspect of the invention is to provide an automotive fiberglass body in which a void or cavity is provided between unitary inner and outer shells for receiving insulative material.

Still a further object of an aspect of an aspect of the invention is to provide an automotive fiberglass body which is easily fabricated while being aesthetically appealing and durable.

The foregoing and other objects of aspects of the invention which will become apparent as the detailed description proceeds are achieved by an automotive body unit comprising an outer body shell having a top edge about the periphery thereof; an inner shell received by said outer body shell at said top edge; and a support member attached to said outer body shell and in supporting interconnection with said inner shell about a bottom periphery thereof.

BRIEF DESCRIPTION OF DRAWINGS

For a complete understanding of the objects, techniques, and structure of the invention, reference should be had to the following detailed description and accompanying drawings wherein:

FIG. 4 is a sectional view of the structure of FIG. 3 taken along the line 4—4; and FIG. 5 is a sectional view of the structure of FIG. 1 taken along the line 5—5.

BEST MODE FOR CARRYING OUT THE INVENTION

Figure 1:
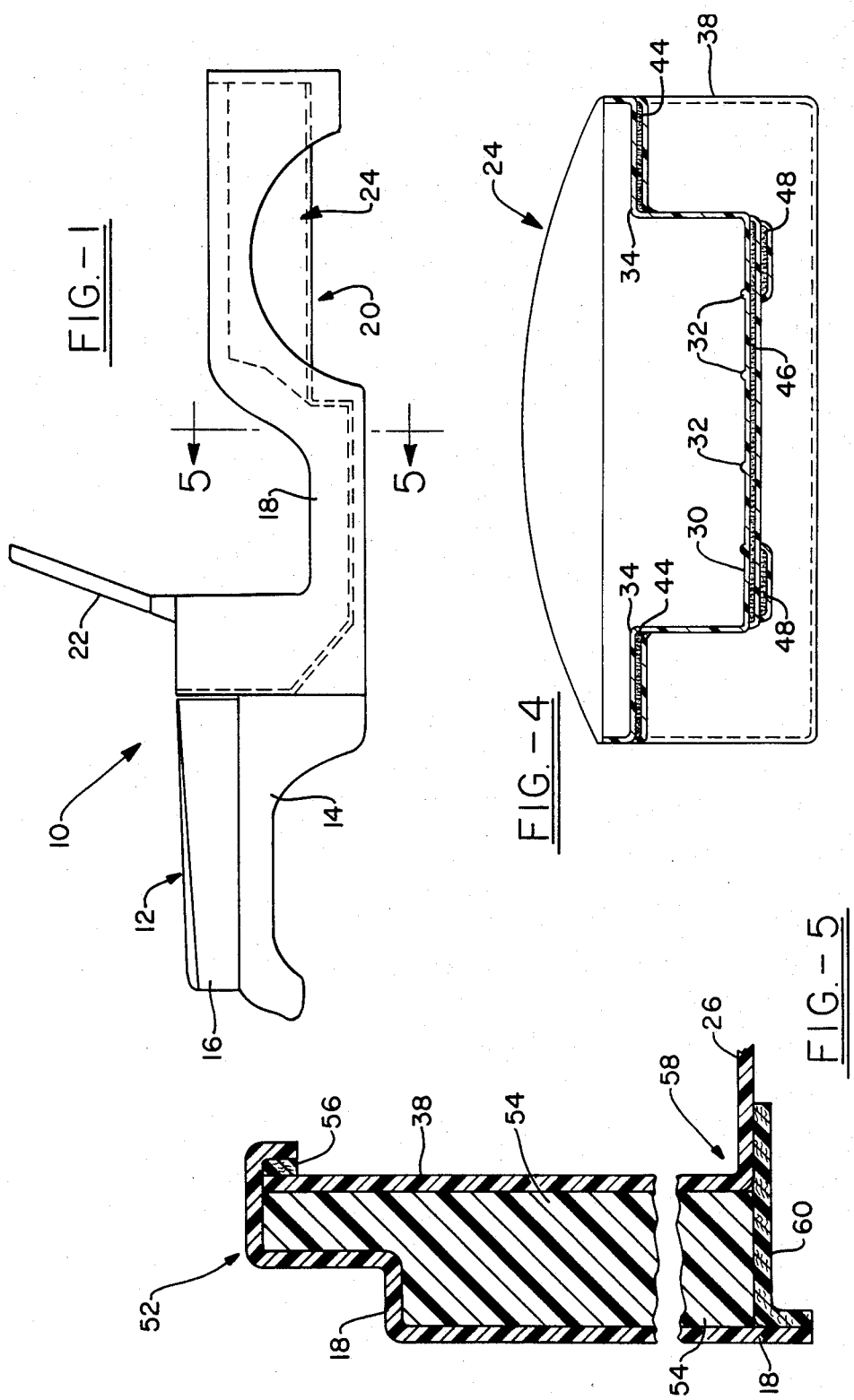
FIG. 1 is a side elevational view of a fiberglass body according to the invention.

Referring now to the drawings and more particularly to FIG. 1, it can be seen that an automotive body shell, particularly adapted for the Jeep CJ5 model, is designated generally by the numeral 10. The body shell 10 includes a front end 12 which, if desired, can be of one-piece construction. The front end 12 includes fenders 14, a hood 16, and a grill (not shown).

The outer or body shell 18 is provided with rear wheel wells 20, and may receive a windshield 22 as illustrated. The outer shell 18 provides for the exterior appearance of the CJ5 model.

Shown in phantom in FIG. 1 is the inner shell and floor pan 24. This structure is again illustrated in top plan view in FIG. 2, where it is shown that the floor pan includes front floor panels 26, separated in standard fashion by the transmission housing 28. At the rear of the inner shell and floor pan 24 is the rear floor panel 30, strengthened by means of reinforcing ribs 32 in standard fashion. It should, at this point, be appreciated that the elements 12, 18, and 24, are of fiberglass construction and are fabricated utilizing state-of-the-art techniques as by forming over or within appropriate molds. As is well known to those skilled in the fiberglass fabrication art, bends, angles, and the like such as the ribs 32, provide reinforcement and strengthening of the fiberglass construction.

Figure 2:
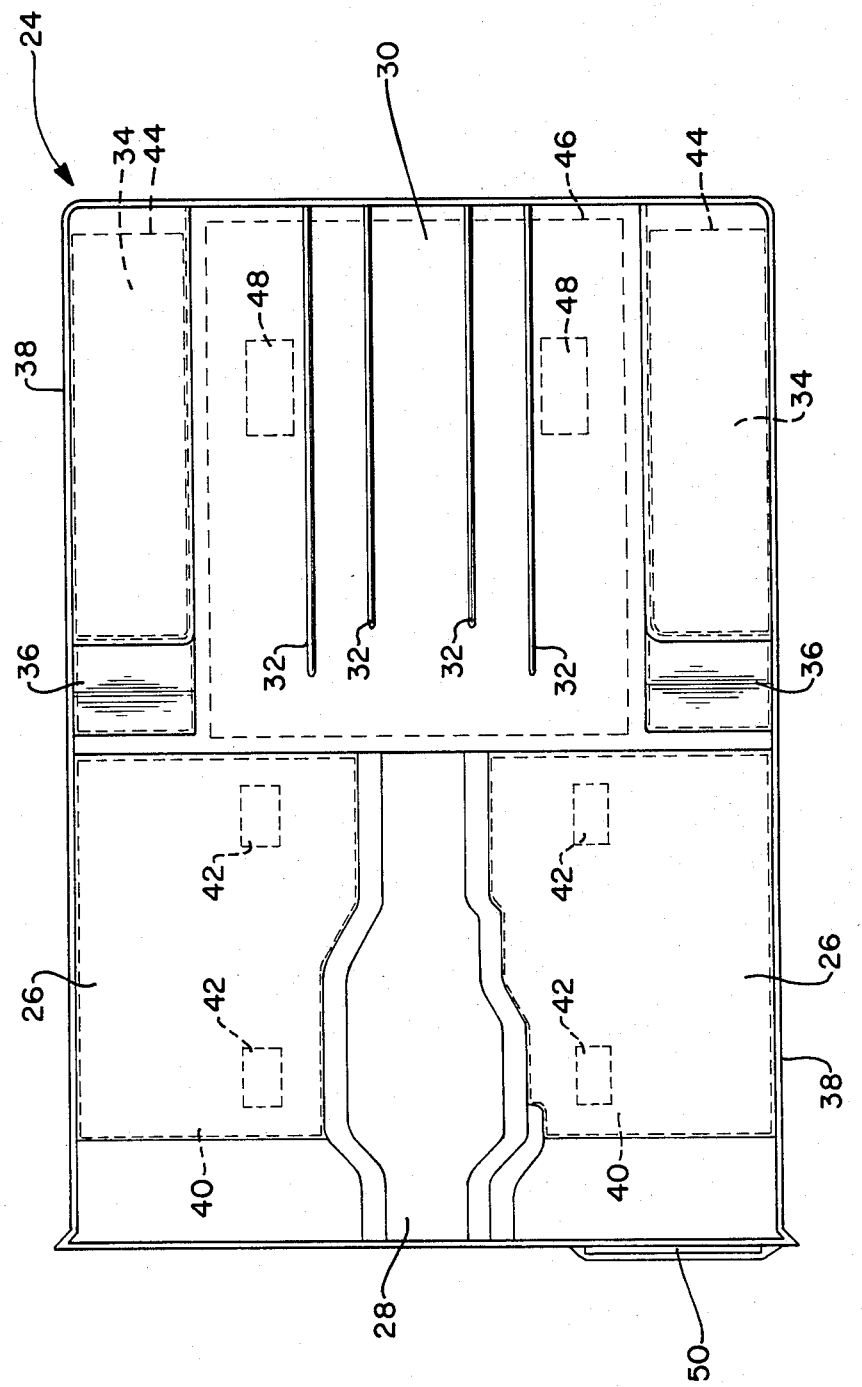
FIG. 2 is a top plan view of the inner shell and floor pan of the invention.
Figure 3:
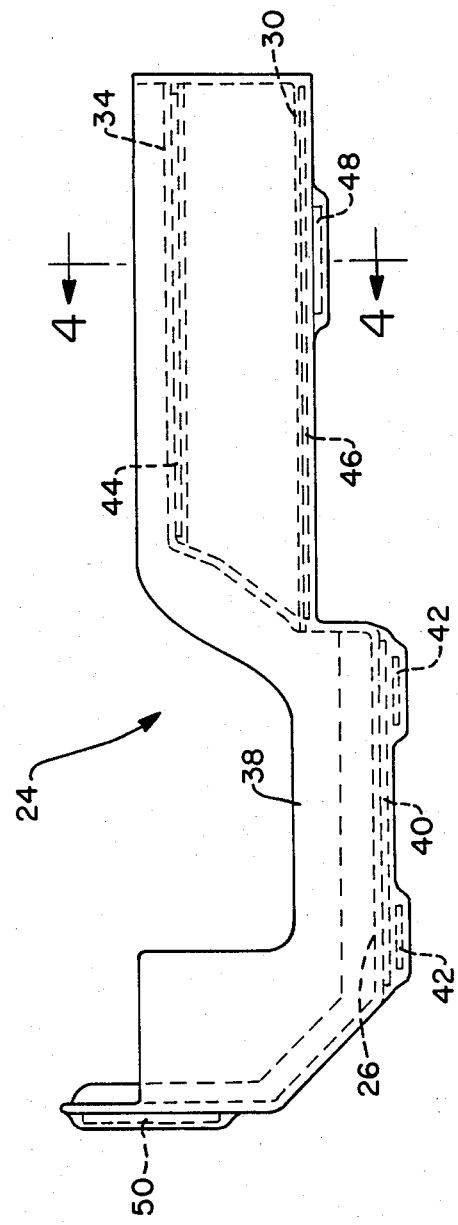
FIG. 3 is a side elevational view of the inner shell and floor pan of FIG. 2.

Fender pans 34 are provided on either side of the rear panel 30 for positioning above the rear wheels wells 20. The fender pans 34 are raised above the rear floor panel 30 and sloped downwardly thereto as at 36. Encompassing the entire inner shell 24 of FIG. 2 is a vertical edge or panel 38. This vertical panel 38 is best illustrated in FIG. 3, and provides the interior sides of the completed automotive body structure when the same is received by the outer body shell 18 as will be illustrated hereinafter. To provide further strength and rigidity to the floor pan, balsa wood is laminated between two layers of fiberglass, as for example at the areas designated by phantom lines 40. This serves to strengthen the front floor panels 26. Also provided is a second thickness of balsa wood within the areas designated by the phantom lines 42 of FIG. 2 for further strengthening. At the areas designated by the lines 42, there are actually two layers of balsa wood, separated from each other by a layer of fiberglass, each being totally encompassed or encased by fiberglass. This structure is best illustrated in FIG. 3. Similar strengthening or reinforcing is provided in the areas designated by phantom lines 44 over the fender pans 34. In the same fashion, balsa wood lamination is provided within the phantom line 46 to reinforce the rear floor panel 30, with double reinforcement being achieved as at the areas designated by the numeral 48.

With specific reference to FIG. 3, it can be seen that the floor panels 26 are reinforced by an entire sheet of balsa wood as at 40, with double laminations of balsa wood being achieved as at 42. Similarly, reinforcement of the fender pans 34 is achieved as at 34 while the rear floor panel 30 is singly reinforced as at 46, and doubly reinforced as at 48. With further reference to FIG. 3, it should be noted that the balsa wood is totally encased within fiberglass, protecting the same from the elements. It will also be seen in both FIGS. 2 and 3 that the firewall of the shell 24 is strengthened and reinforced as by a metal plate 50, the same again being encased or sandwiched by fiber-glass.

Brief reference is here made to FIG. 4 wherein a sectional view of the structure of FIG. 3, taken along the line 4—4, further illustrates the balsa wood reinforcement at the rear of the shell 24. This figure further illustrates the raised nature of the fender panels 34 above the rear floor panel 30. Also shown are the reinforcing ribs 32 and balsa wood sandwiching as at 44,46, and 48.

With reference now to FIG. 5, a particularly novel feature of the invention is shown in exploded sectional detail. Here it will be seen that the front edge of the outer body shell 18 is characterized by an inverted U-shaped receptacle 52. The receptacle 52 receives therein the top edge of the vertical edge or panel 38 of the shell 24. When the outer shell 18 receives the inner shell 24, a cavity or void is provided therebetween, which cavity receives styrofoam, urethane, or other close foam insulative material 54. This insulative material provides strength and rigidity for the body unity comprising the shell 18,24. Further, the material 54 provides both thermal and sound insulation to the interior. The vertical edge or panel 38 is secured to the inverted U-shaped receptacle 52 by means of an appropriate fiberglass compound as at 56, sealing and unifying the body construction.

As further illustrated in FIG. 5, the floor panel 26 meets with the vertical edge or panel 38 at a right angle bend 58. There is provided a single piece construction between the interior floor panel and the interior vertical side panel. This right angle bend 58 obviates any seams between the vertical side panel and the floor, while providing strength and rigidity to the assembly as a whole. As further illustrated in FIG 5, a support member or angle 60 is provided about the periphery of the inner and outer shells 18 and 24 to achieve secured engagement therebetween. The support member 60 is of fiberglass construction and, in standard fashion, is adhered to the interior of the outer shell 18 and to the exterior of the inner shell 24. This support member 60 thus supports the inner shell.

It will be appreciated that once the inner shell 24 and outer shell 18 have been fabricated, the shell 24 is placed within the inverted U-shaped receptacle 52 and secured thereto as at 56. The insulative material 54 is then placed in the cavity between the shells 24,18, and the cavity is then sealed by the support member 60. Of course, the hood 16 is then added separately and does not specifically comprise a portion of the invention herein. There is thus provided a unitary body shell with the interior shell being totally devoid of seams and with the inner shell actually providing the finished interior of the vehicle.

Thus it can be seen that the objects of the invention have been achieved by the structure presented hereinabove. While in accordance with the patent statutes only the best mode and preferred embodiment of the invention have been presented and described in detail, the invention is not limited thereto or thereby. It will be apparent to those skilled in the art that the techniques and structure presented herein are readily adapted for utilization with various other automotive body structures. Accordingly, for an appreciation of the true scope and breadth of the invention, reference should be had to the appended claims.

What is claimed is:
1. An automotive body unit comprising:
   a fiberglass outer shell having a top edge about the periphery thereof, said top edge being, in cross-section, of an inverted U-shape;
   a fiberglass inner shell received by said outer body still at said top edge and within said U-shape, forming a cavity between said inner shell and outer body shell, said cavity being filled with a close foam insulative material;
   a support member attached to said outer body shell and in supporting interconnection with said inner shell about the bottom periphery thereof, said support member including a right angle and sealing said cavity;
   wherein said inner shell includes a vertical panel interconnected at right angles to a floor pan, said inner shell being of unitary construction; and
   wherein portions of said floor pan further include two layers of balsa wood sandwiched between two layers of fiber-glass, with a third layer of fiberglass therebetween.

* * * * *